US008116934B2

(12) United States Patent
Ishikawa

(10) Patent No.: US 8,116,934 B2
(45) Date of Patent: Feb. 14, 2012

(54) VEHICLE FAILURE ANALYSIS SYSTEM, VEHICLE FAILURE ANALYSIS APPARATUS, AND VEHICLE FAILURE ANALYSIS METHOD

(75) Inventor: Tomoyasu Ishikawa, Nagoya (JP)

(73) Assignee: Toyota Jidosha Kabushiki Kaisha, Aichi-Ken (JP)

( * ) Notice: Subject to any disclaimer, the term of this patent is extended or adjusted under 35 U.S.C. 154(b) by 257 days.

(21) Appl. No.: 12/467,476

(22) Filed: May 18, 2009

(65) Prior Publication Data

US 2009/0292417 A1 Nov. 26, 2009

(30) Foreign Application Priority Data

May 20, 2008 (JP) ................................. 2008-132303

(51) Int. Cl.
*G06F 19/00* (2011.01)

(52) U.S. Cl. ................. 701/34; 701/36; 701/39; 701/43

(58) Field of Classification Search .................... 701/33, 701/34, 36, 39, 43

See application file for complete search history.

(56) References Cited

U.S. PATENT DOCUMENTS

| | | | | |
|---|---|---|---|---|
| 6,525,654 | B1 * | 2/2003 | Siggers | 340/438 |
| 6,995,567 | B2 * | 2/2006 | Kawashima et al. | 324/522 |
| 7,245,995 | B2 * | 7/2007 | Kueperkoch et al. | 701/29 |
| 7,742,898 | B2 * | 6/2010 | Vollmer et al. | 702/185 |
| 7,831,347 | B2 * | 11/2010 | Oesterling | 701/33 |
| 7,877,177 | B2 * | 1/2011 | Kueperkoch et al. | 701/34 |

FOREIGN PATENT DOCUMENTS

| | | | |
|---|---|---|---|
| JP | 2005-43138 | A | 2/2005 |
| JP | 2006-251918 | A | 9/2006 |

* cited by examiner

*Primary Examiner* — Toan To
(74) *Attorney, Agent, or Firm* — Sughrue Mion, PLLC

(57) ABSTRACT

A vehicle failure analysis system for a vehicle equipped with a plurality of control systems, each of which includes one or more components, includes: a faulty system identification unit that identifies a faulty control system from among the plurality of control systems; and a faulty component identification unit that identifies a faulty component from among the one or more components which are constituents of the identified control system.

19 Claims, 11 Drawing Sheets

VEHICLE FAILURE ANALYSIS SYSTEM, VEHICLE FAILURE ANALYSIS APPARATUS, AND VEHICLE FAILURE ANALYSIS METHOD

INCORPORATION BY REFERENCE

The disclosure of Japanese Patent Application No. 2008-132303 filed on May 20, 2008, including the specification, drawings and abstract is incorporated herein by reference in its entirety.

BACKGROUND OF THE INVENTION

1. Field of the Invention

The invention relates to a vehicle failure analysis system, vehicle failure analysis apparatus and vehicle failure analysis method that are suitably applied to a vehicle, such as a passenger car, a truck and a bus.

2. Description of the Related Art

In recent vehicles, in order to implement various controls in a vehicle, one or more components that are in-vehicle devices or that constitute in-vehicle devices, sensors that detect various pieces of control information related to these components, and an electronic control unit ECU) that controls these components using these various pieces of control information form a group. A group of these components are connected directly or through communication standard, such as a controller area network (CAN), to one another. Thus, a plurality of types of control systems, typically, such as an intake system, exhaust system and ignition system of an engine, a brake system, a car navigation system and an air conditioning system, are respectively formed.

Japanese Patent Application Publication No. 2006-251918 (JP-A-2006-251918) describes a system that identifies a faulty component on the basis of control information when a failure occurs in any one of control systems. In this system, a monitoring ECU acquires and accumulates control information for the control systems via a CAN, and, when a failure occurs in any one of the components in a vehicle, a center (hereinafter, also referred to as "road-side center" in this specification) provided at a location other than the vehicle collects the control information accumulated in the monitoring ECU via a base station and a network or a wire communication. Then, at the road-side center, the faulty components and the natures of the failures corresponding to these pieces of control information are input by an input device to associate these pieces of control information with the faulty components and the natures of the failures, thus creating a database.

At the above road-side center, after the database is created by associating the faulty components and the natures of the failures with the corresponding pieces of control information and is then stored in a storage medium, such as a hard disk, it is possible to identify a faulty component on the basis of a comparison of the control information, acquired from the above described monitoring ECU by the center, with the database.

However, in the system described in JP-A-2006-251918, the road-side center compares the control information, acquired from the monitoring ECU of the vehicle by the road-side center, with the entire database stored in the road-side center to identify a faulty component. This may increase a processing load for identification.

In addition, in the system described in JP-A-2006-251918, at the vehicle side, when a failure occurs in any one of the components in the vehicle, before a user drives the vehicle to a dealer, or the like, and identifies a faulty component for replacement or repair, it is necessary to carry out fail-safe control over the control system, to which the faulty component belongs, in order to drive the vehicle from a failure site to a dealer, or the like. However, the system is not able to provide information necessary for carrying out the fail-safe control, and is not able to sufficiently provide useful information for control at the time of a failure.

SUMMARY OF THE INVENTION

The invention provides a vehicle failure analysis system, vehicle failure analysis apparatus and vehicle failure analysis method that are able to sufficiently provide useful information for control at the time of a failure without increasing a processing load.

A first aspect of the invention provides a vehicle failure analysis system. The vehicle failure analysis system is used for a vehicle equipped with a plurality of control systems, each of which includes one or more components. The vehicle failure analysis system includes: a faulty system identification unit that identifies a faulty control system from among the plurality of control systems; and a faulty component identification unit that identifies a faulty component from among the one or more components which are constituents of the identified control system.

The vehicle failure analysis system may further include an acquisition unit that acquires pieces of control information from the plurality of control systems, wherein the faulty system identification unit may identify the faulty control system from among the plurality of control systems by comparing a first correlation between the pieces of control information and the control systems with the acquired pieces of control information.

With the above vehicle failure analysis system, in the vehicle equipped with the plurality of control systems, each of which is formed of one or more components, when a failure occurs in any one of the control systems, first, the faulty system identification unit is able to identify a faulty control system on the basis of a comparison of the acquired control information with the first correlation.

The vehicle failure analysis system may further include a collecting unit that collects the control information from the acquisition unit, wherein the faulty component identification unit may identify the faulty component from among the one or more components by comparing a second correlation between the one or more components and the pieces of control information partitioned in units of the control systems with the collected control information.

The faulty component identification unit is able to read only part of the second correlation between the one or more components and the pieces of control information partitioned in units of the control systems, the part of the second correlation corresponding to the identified control system, and is able to identify a faulty component from among the one or more components of the identified control system on the basis of a comparison of the part of the second correlation corresponding to the identified control system with the collected control information.

In addition, the faulty system identification unit also reads only part of the second correlation between the one or more components and the pieces of control information partitioned in units of the control systems, the part of the second correlation corresponding to the identified control system, and then compares the part of the second correlation corresponding to the identified control system with the collected control information. In comparison with a case where the entire second correlation is read and compared with the collected control information, it is possible to reduce a processing load on the faulty system identification unit.

Furthermore, in a step before the faulty component identification unit identifies a faulty component from among the one or more components of the identified control system, the faulty system identification unit is able to identify a faulty control system from among the plurality of control systems.

In the vehicle failure analysis system, the faulty system identification unit may be provided for the vehicle, and the faulty component identification unit may be provided at a location other than the vehicle.

In a step before the faulty component identification unit provided at a location other than the vehicle identifies a faulty component from among the one or more components of the identified control system, the faulty system identification unit is able to identify a faulty control system from among the plurality of control systems. Thus, when fail-safe control is carried out over the identified control system, the vehicle failure analysis system may have a further advantageous configuration.

Furthermore, when the faulty component identification unit identifies a faulty component from among the one or more components of the identified control system by comparing the second correlation with the collected control information, the data size of the second correlation is considerably larger than the data size of the first correlation. Thus, a large throughput is required.

For this reason, when the faulty component identification unit is provided at a location other than the vehicle, the vehicle failure analysis system may have a further advantageous configuration. In addition, it is possible to further easily optimize the second correlation by updating the second correlation one after another.

Thus, the faulty system identification unit is provided for the vehicle, and the faulty component identification unit is provided at a location other than the vehicle. By so doing, in a situation that a failure actually occurs, it is possible to configure the vehicle failure analysis system on the basis of an actual situation required at the vehicle and at a location other than the vehicle.

In the vehicle failure analysis system, the faulty system identification unit and the faulty component identification unit may be provided for the vehicle.

With the above configuration, it is possible to identify a faulty component from among the one or more components of the identified control system at the vehicle. Thus, the flexibility of control at the time of a failure, such as fail-safe control carried out over part of the identified control system, related to the identified component, may be further improved.

A second aspect of the invention provides a vehicle failure analysis apparatus. The vehicle failure analysis apparatus is used for a vehicle equipped with a plurality of control systems, each of which includes one or more components. The vehicle failure analysis apparatus includes: a faulty system identification unit that identifies a faulty control system from among the plurality of control systems; and a faulty component identification unit that identifies a faulty component from among the one or more components which are constituents of the identified control system.

The vehicle failure analysis apparatus may further include an acquisition unit that acquires pieces of control information from the plurality of control systems, wherein the faulty system identification unit may identify the faulty control system from among the plurality of control systems by comparing a first correlation between the pieces of control information and the control systems with the acquired pieces of control information.

Furthermore, the vehicle failure analysis apparatus may further include a collecting unit that collects the control information from the acquisition unit, wherein the faulty component identification unit may identify the faulty component from among the one or more components by comparing a second correlation between the one or more components and the pieces of control information partitioned in units of the control systems with the collected control information.

A third aspect of the invention provides a vehicle failure analysis method. The vehicle failure analysis method is used for a vehicle equipped with a plurality of control systems, each of which includes one or more components. The vehicle failure analysis method includes: identifying a faulty control system from among the plurality of control systems; and identifying a faulty component from among the one or more components which are constituents of the identified control system.

The vehicle failure analysis method may further include acquiring pieces of control information from the plurality of control systems, wherein the faulty control system may be identified from among the plurality of control systems by comparing a first correlation between the pieces of control information and the control systems with the acquired pieces of control information.

The vehicle failure analysis method may further include collecting the control information acquired from the plurality of control systems, wherein the faulty component may be identified from among the one or more components by comparing a second correlation between the one or more components and the pieces of control information partitioned in units of the control systems with the collected control information.

With the above configuration as well, in the vehicle equipped with the plurality of control systems, each of which is formed of one or more components, when a failure occurs in any one of the control systems, first, it is possible to identify a faulty control system from among the plurality of control systems.

In accordance with this, when the faulty component is identified, it is possible to read only part of the second correlation between the one or more components and the pieces of control information partitioned in units of the control systems, the part of the second correlation corresponding to the identified control system, and it is possible to identify the faulty component from among the one or more components of the identified control system by comparing the part of the second correlation corresponding to the identified control system with the collected control information.

In addition, when the faulty control system is identified as well, it is only necessary to read only part of the second correlation between the one or more components and the pieces of control information partitioned in units of the control systems, the part of the second correlation corresponding to the identified control system and then compare the part of the second correlation corresponding to the identified control system with the collected control information. Thus, in comparison with a case where the entire second correlation is read and compared with the collected control information, it is possible to reduce a processing load when the faulty control system is identified.

Furthermore, in a step before a faulty component is identified from among the one or more components of the identified control system, it is possible to identify a faulty control system from among the plurality of control systems. Thus, it is possible to promptly carry out fail-safe control over the faulty control system. Thus, it is possible to sufficiently provide useful information for control at the time of a failure.

According to the aspects of the invention, it is possible to provide a vehicle failure analysis system, vehicle failure analysis apparatus and vehicle failure analysis method that are able to sufficiently provide useful information for control at the time of a failure without increasing a processing load.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
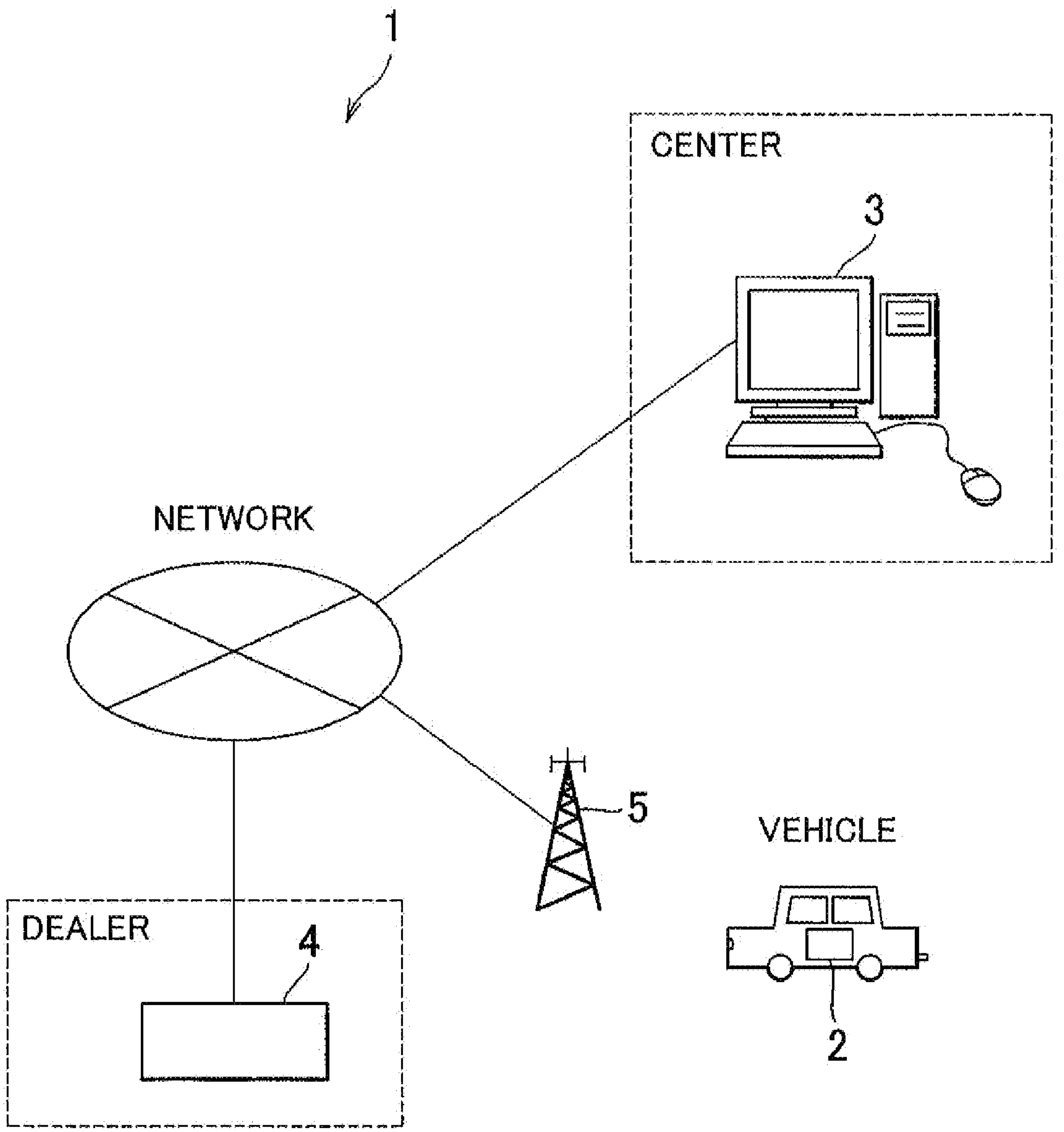
FIG. 1 is a block diagram that shows a vehicle failure analysis system according to a first embodiment of the invention.
Figure 2:
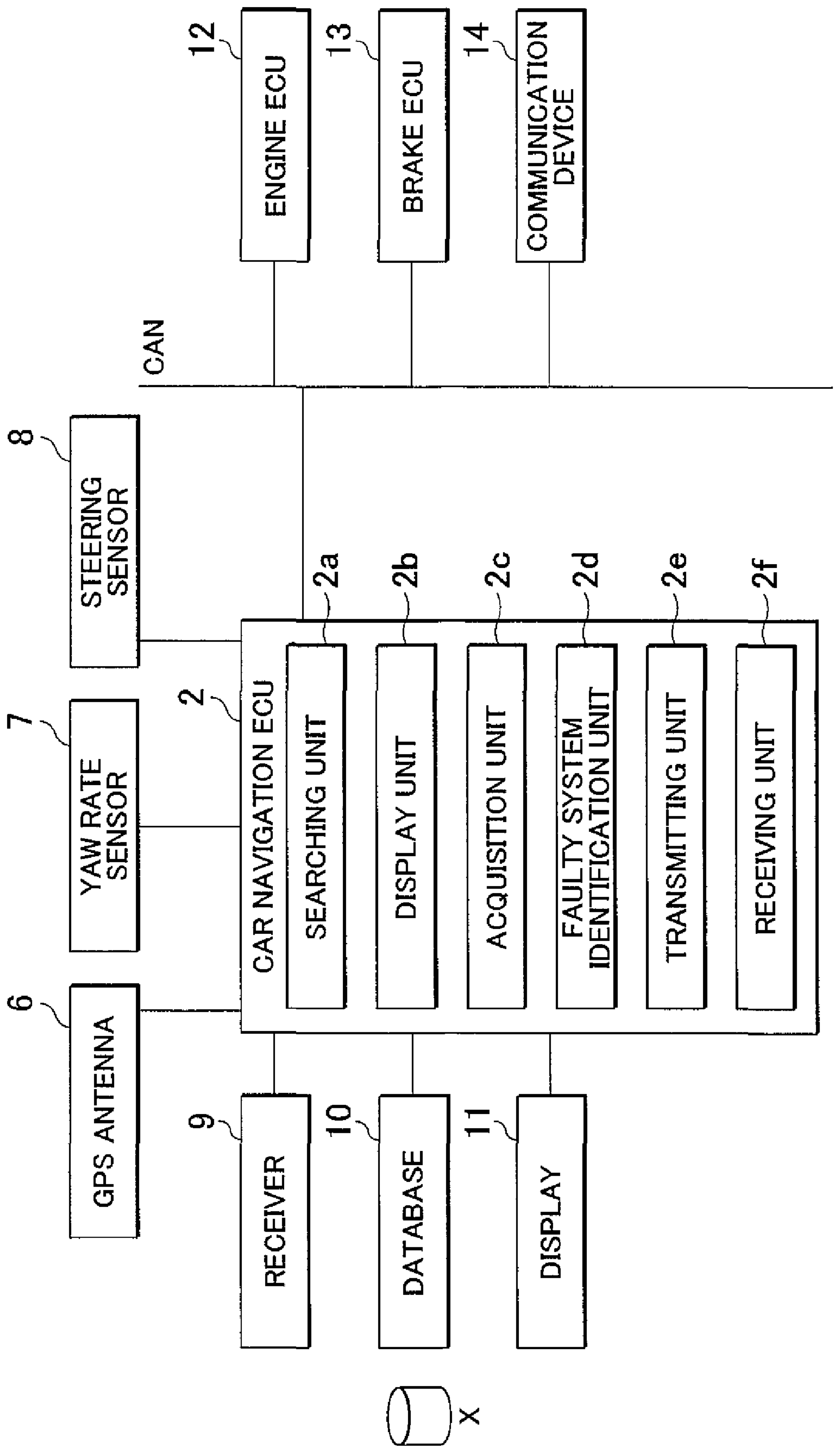
FIG. 2 is a block diagram that shows part of the vehicle failure analysis system according to the first embodiment of the invention.
Figure 3:
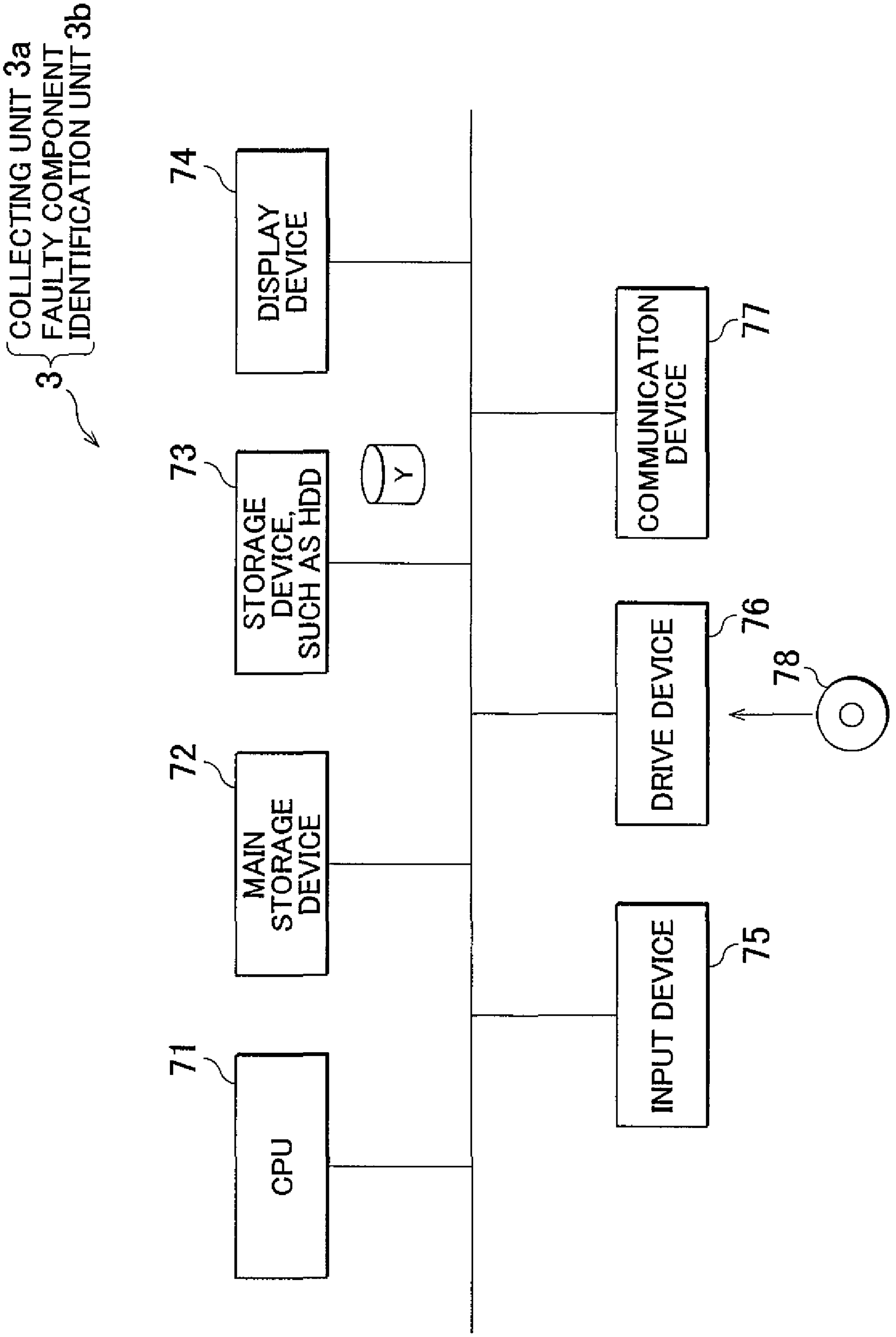
FIG. 3 is a block diagram that shows part of the vehicle failure analysis system according to the first embodiment of the invention.

FIG. 1 is a block diagram that shows a vehicle failure analysis system according to a first embodiment of the invention. FIG. 2 is a block diagram that shows the configuration of the vehicle failure analysis system at a vehicle side according to the first embodiment of the invention. FIG. 3 is a block diagram that shows the configuration of the vehicle failure analysis system at a road side according to the first embodiment of the invention.

As shown in FIG. 1, the vehicle failure analysis system 1 according to the first embodiment of the invention includes a car navigation electronic control unit (ECU) 2, a server 3, a diagnostic tool 4 and a base station 5. The car navigation ECU 2 constitutes a plurality of in-vehicle devices mounted on a vehicle. The server 3 is provided at a center at a location other than the vehicle (hereinafter, also referred to as "at a road side" in this specification). The diagnostic tool 4 is provided at a dealer at a road side. The server 3, the diagnostic tool 4 and the base station 5 are connected through a network, and the car navigation ECU 2 is communicable with the base station 5, connected to the network, by a wireless communication or a wire communication.

The network is formed of a wire communication or a wireless communication. The wire communication, for example, includes a public switched telephone network (PSTN), an integrated services digital network (ISDN) and an optical fiber. The wireless communication, for example, includes a cellular phone network, a personal handy-phone system (PHS) network, a wireless LAN network, a worldwide interoperability for microwave access (WiMAX) network, a satellite phone and a beacon.

Note that a communication using the network between the server 3 and the car navigation ECU 2 is in conformity with a point to point protocol (PPP). The network communication establishes data link using PPP to implement a transmission control protocol/internet protocol (TCP/IP), which is an upper layer protocol, a hyper text transfer protocol (HTTP), which is upwardly compatible with TCP/IP, or a file transfer protocol (FTP). The network communication constitutes the Internet or a wide area network (WAN) to enable data transmission and reception between the server 3 and the car navigation ECU 2.

Next, the car navigation ECU 2 of the vehicle will be described in detail with reference to the accompanying drawing. FIG. 2 is a schematic view that shows the car navigation ECU 2, which constitutes part of the vehicle failure analysis system 1, according to the first embodiment of the invention.

As shown in FIG. 2, the car navigation ECU 2 is connected to a global positioning system (GPS) antenna 6, a yaw rate sensor 7, a steering sensor 8, a receiver 9, a database 10 and a display 11.

Furthermore, the car navigation ECU 2 is connected to an engine ECU 12, a brake ECU 13, ECUs (not shown) that constitute the other control systems and a communication device 14 through a communication standard, such as a controller area network (CAN).

Here, the engine ECU 12 is, for example, formed of a CPU, a ROM, a RAM, an EEPROM, a data bus, and an input/output interface. The data bus connects the CPU, the ROM, the RAM and the EEPROM to one another. In accordance with a program stored in the ROM, the engine ECU 12 detects control information, such as an intake air flow rate and intake air temperature at an intake manifold of an engine (not shown), a throttle opening degree, an accelerator operation amount, and an air sensor value, to control an intake system of the engine, and detects control information, such as a catalyst temperature, to control an exhaust system of the engine. Furthermore, the engine ECU 12 detects a spark advance, a misfire state, a secondary air flow rate, an engine load, and the like, to control an ignition system of the engine.

In addition, the brake ECU 13 is also, for example, formed of a CPU, a ROM, a RAM, an EEPROM, a data bus and an input/output interface. The data bus connects the CPU, the ROM, the RAM and the EEPROM to one another. In accordance with a program stored in the ROM, the brake ECU 13, at the time of braking, detects a brake operation amount input through a brake pedal (not shown) by a driver and an engine rotational speed transmitted from the engine ECU 12 through the CAN, and calculates and detects a vehicle speed on the basis of a wheel speed transmitted from a wheel speed sensor (not shown).

Furthermore, the brake ECU 13 controls a braking system. The braking system supplies hydraulic pressure to a cylinder of each braking device on the basis of these piece of control information such as the brake operation amount, the engine rotational speed and the vehicle speed. Each braking device is provided so as to place both axial end surfaces of a brake disc, which is integrally rotatable with a wheel, in between. Thus, brake pads of the braking device are pressed against the brake disc to generate a braking force.

In this way, the engine ECU 12 constitutes three control systems that respectively control the intake system, exhaust system and ignition system of the engine (not shown), and the brake ECU 13 constitutes a control system that controls the braking system.

The engine ECU 12 and the brake ECU 13, which constitute the above control systems, and the other ECUs each detect control information of a corresponding one of the control system. When a failure occurs in any one of the control systems, the engine ECU 12, the brake ECU 13 or the other ECUs corresponding to that control system transmits detected control information, that is, freeze frame data (FFD), together with a diagnostic trouble code (DTC) to an acquisition unit 2*c* of the car navigation ECU 2 through the CAN.

The car navigation ECU 2 is, for example, formed of a CPU, a ROM, a RAM, an EEPROM, a data bus, and an input/output interface. The data bus connects the CPU, the ROM, the RAM and the EEPROM to one another. In accordance with a program stored in the ROM, the car navigation ECU 2 functions as a searching unit 2*a*, a display unit 2*b*, the acquisition unit 2*c*, a faulty system identification unit 2*d*, a transmitting unit 2*e* and a receiving unit 2*f* that respectively carry out the following controls.

The GPS antenna 6 receives radio waves from three satellites from among a plurality of satellites launched into orbit around the earth. Based on these three radio waves, the searching unit 2*a* of the car navigation ECU 2 determines a current position, at which the vehicle is located, on the principles of, for example, triangulation. Note that, to improve the accuracy, four satellites are used.

Here, the yaw rate sensor 7 detects a yaw rate of the vehicle, and the steering sensor 8 is provided for a steering device (not shown) of the vehicle and detects a steering angle. The database 10 is formed of a storage medium, such as a CD-ROM and a DVD-ROM. The database 10 stores display map information and search map information, including locations of dealers. The database 10 stores instruction data X that include a first correlation between pieces of control information and the corresponding control systems. The faulty system identification unit 2*d* uses the instruction data X to identify a faulty control system from among a plurality of types of control systems on the basis of control information acquired by the acquisition unit 2*c*.

The first correlation is determined on the basis of the relationship between pieces of control information acquired by the acquisition unit 2*c* and the corresponding actual failures. More specifically, the first correlation includes a correlation that is derived through mining using a method, such as statistics and pattern recognition, on the basis of large amounts of data that associate pieces of control information, acquired by the acquisition unit 2*c* in a past travel history with reference to the time at which the control information of the vehicle is currently acquired by the acquisition unit 2*c*, with information that includes faulty control systems, each of which is determined to include an actual faulty component through actual replacement or repair of the faulty component at a dealer.

The display 11 also functions as a touch panel, that is, an input device. A driver uses the input device to input a destination and a searching condition, such as choices of no expressway, shortest distance or shortest time. The display 11 displays information regarding a route searched by the searching unit 2*a* of the car navigation ECU 2 on the basis of the search map information using the destination and searching condition input by the driver or information regarding an emergency route searched by the searching unit 2*a* on the basis of the search map information using the destination indicating the location of a dealer, which is set because of occurrence of a failure, and the searching condition, together with the display map information on the basis of a command of the display unit 2*b* of the car navigation ECU 2.

The receiver 9 is compliant with an optical or radio wave beacon. The receiver 9 receives road information, including traffic jam information, from a vehicle information & communication system (VICS).

In this way, the searching unit 2*a* of the car navigation ECU 2 calculates a travel distance and direction of the vehicle on the basis of a vehicle speed acquired from the brake ECU 13, a yaw rate detected by the yaw rate sensor 7 and a steering angle detected by the steering sensor 8 to determine a current position of the vehicle by an inertial navigation system (INS). Thus, the searching unit 2*a* complements a current position of the vehicle when the vehicle is located between tall buildings or in a tunnel and, therefore, the GPS antenna 6 cannot receive radio waves from the satellites.

Then, the display unit 2*b* of the car navigation ECU 2 displays the display map information in the database 10, the current position of the vehicle, determined through the above described method, the destination input by the touch panel, that is, the display 11, and information regarding the route searched by the searching unit 2*a* all together on the display 11.

In addition to this, when a failure occurs in any one of the above described plurality of types of control systems and then the acquisition unit 2*c* of the car navigation ECU 2 acquires a DTC through the CAN, the searching unit 2*a* determines the current position at which the vehicle is located at the time when the acquisition unit 2*c* acquires the DTC, and searches an emergency route with the current position as a starting point and a dealer as a destination on the basis of the search map information in the database 10. The display unit 2*b* of the car navigation ECU 2 displays the emergency route together with the display map information on the display 11.

Furthermore, the acquisition unit 2*c* of the car navigation ECU 2 acquires pieces of control information from the above described plurality of types of control systems through the CAN. In addition, the faulty system identification unit 2*d* of the car navigation ECU 2 identifies a faulty control system from among a plurality of types of control systems in the vehicle equipped with the plurality of types of control systems, each of which is formed of one or more components as described above.

More specifically, the faulty system identification unit 2*d* of the car navigation ECU 2 identifies a faulty control system from among the plurality of types of control systems on the basis of a comparison between the instruction data X including the first correlation between the pieces of control information and the control systems, in the database 10 and the control information acquired by the acquisition unit 2*c*. The faulty system identification unit 2*d* transmits a command for carrying out fail-safe control to the identified control system through the CAN. The control system, which receives the command, carries out fail-safe control.

The transmitting unit 2*e* of the car navigation ECU 2 transmits information about the control system identified by the faulty system identification unit 2*d* and the FFD, that is, the control information, related to the identified control system to the server 3 at the road-side center through the communication device 14, the base station 5 and the network.

Next, the server 3 at the road-side center will be described in detail with reference to the accompanying drawing. FIG. 3 is a schematic view that shows the server 3 at the road-side center, which constitutes part of the vehicle failure analysis system 1 according to the first embodiment of the invention. The server 3 executes control at the road-side center that constitutes part of the vehicle failure analysis system according to the first embodiment of the invention.

As shown in FIG. 3, the server 3 includes a CPU 71, a main storage device 72, a storage device 73, such as an HDD, a display device 74, an input device 75, a drive device 76 and a communication device 77, which are connected to one another via a bus. The server 3 constitutes a collecting unit 3*a* and a faulty component identification unit 3*b* that respectively execute the following controls.

Here, the CPU 71 loads a program, such as an OS or an application, from the storage device 73 to execute the program. Thus, the CPU 71 provides various functions, and collectively controls processes executed by the server 3. The main storage device 72 is formed of a RAM, and constitutes a work area in which an OS, a program, or data are temporarily stored.

The storage device 73 is a non-volatile memory, such as an HDD or a flash memory, and stores an OS, a program, a transmission source ID of each vehicle, and pieces of control information related to the identified control systems that are transmitted from the transmitting unit 2*e* of the car navigation ECU 2 and received through the base station 5, the network and the communication device 77.

In addition, the storage device 73 stores instruction data Y that include a second correlation between pieces of control information and components in addition to the above described instruction data X. The second correlation is determined on the basis of the pieces of control information collected by the collecting unit 3*a* and the actual failures. More specifically, the second correlation includes a correlation that is derived through mining using a method, such as statistics and pattern recognition, on the basis of large amounts of data that associate pieces of control information, collected from the acquisition unit 2*c* of the car navigation ECU 2 by the collecting unit 3*a* of the server 3 in a past travel history with reference to the time at which the control information of the vehicle is currently acquired by the acquisition unit 2*c*, with information that includes actual faulty components, each of which is identified by the faulty component identification unit 3*b* in the past and determined through actual replacement or repair of the component at a dealer.

That is, the instruction data Y provide a second correlation by which the faulty component identification unit 3*b* of the server 3 identifies a faulty component from among the components of the control system identified by the faulty system identification unit 2*d* of the car navigation ECU 2. Each time a failure occurs in the vehicle, the instruction data Y are updated by adding new large amounts of data that associate control information acquired by the acquisition unit 2*c* of the car navigation ECU 2 with information that the failure is determined as an actual failure at a dealer. In addition, the instruction data Y are partitioned in units of the corresponding control systems and then stored in the storage device 73.

The display device 74 draws an image on a display (not shown), such as a liquid crystal display, in predetermined resolution, number of colors, and the like, in accordance with a command of the CPU 71 based on screen information instructed by a program. The display device 74, for example, forms a graphical user interface (GUI) screen, and displays various types of windows, data, and the like, necessary for operation on the display.

The input device 75 is formed of a keyboard, a mouse, and the like, and is used to input various operating instructions. The drive device 76 allows a storage medium 78 to be inserted therein. The drive device 76 reads data stored in the storage medium 78 and transfers the read data to the main storage device 72, and the like. The communication device 77 is an interface for connection to a network, such as the Internet and a LAN. The communication device 77 is, for example, formed of a modem, an NIC, or the like.

With the above configuration, when the CPU 71 executes the program, the collecting unit 3*a* of the server 3 collects the control system identified by the faulty system identification unit 2*d* and its related control information, which are transmitted by the transmitting unit 2*e* of the above described car navigation ECU 2 through the communication device 14.

The faulty component identification unit 3*b* of the server 3 reads the second correlation between the pieces of control information, partitioned in units of the control systems, and the corresponding components from the instruction data Y, and identifies a faulty component on the basis of a comparison of the control information collected by the collecting unit 3*a* with the instruction data Y.

Figure 4A:
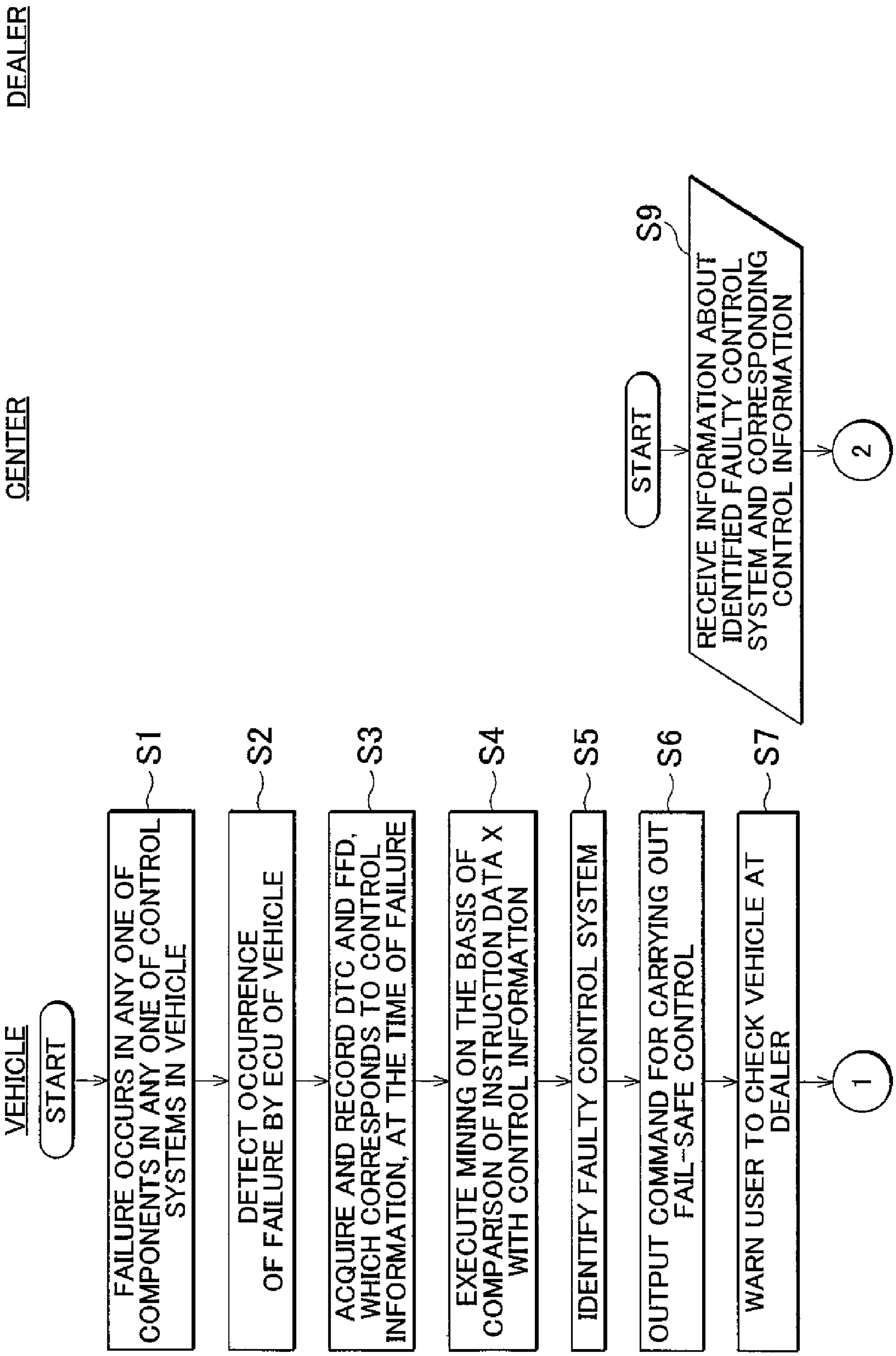
FIGS. 4A and 4B are flowcharts that show the processes of control executed by the vehicle failure analysis system according to the first embodiment of the invention.
Figure 4B:
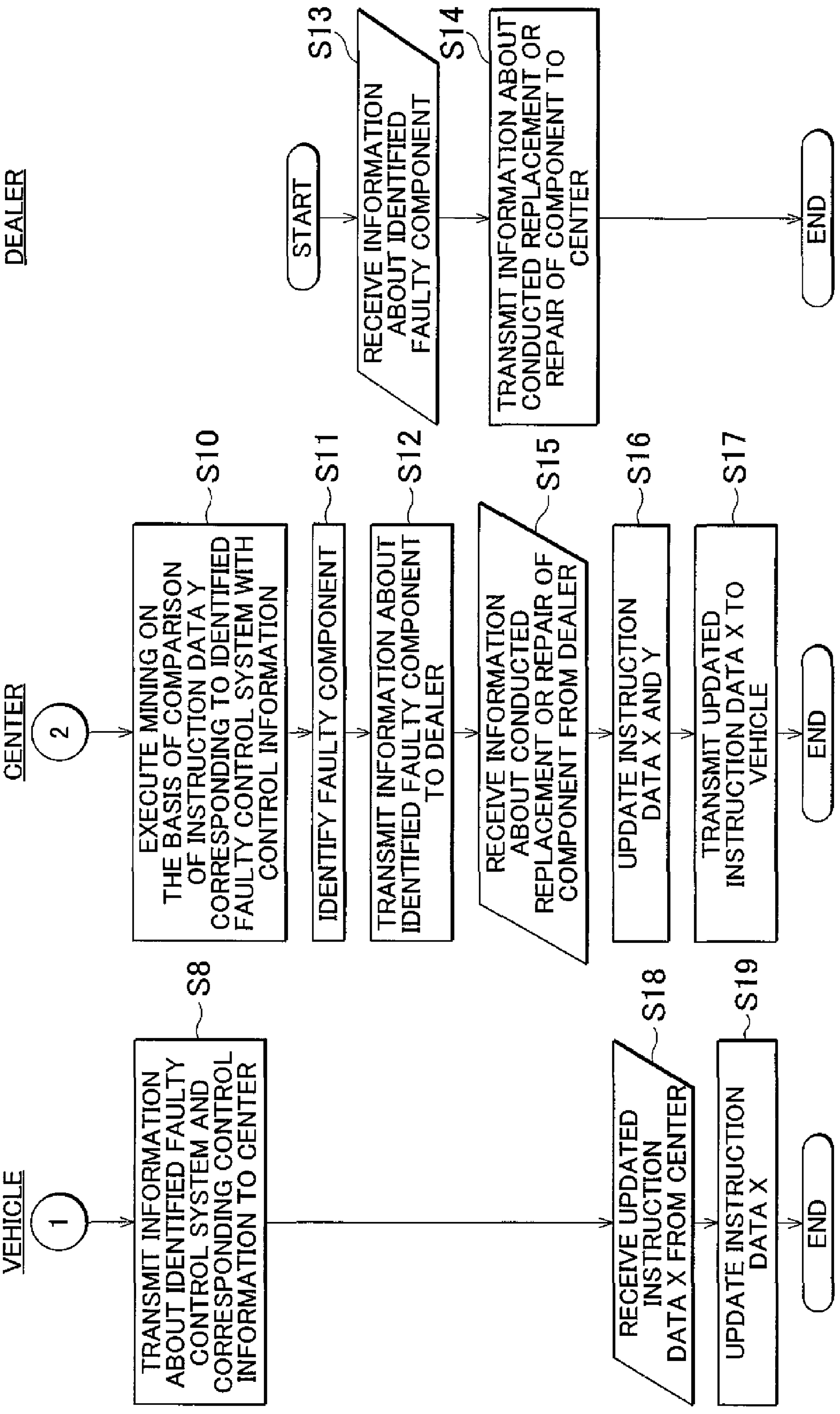

The processes of control executed by the vehicle failure analysis system 1 according to the first embodiment will be described with reference to the flowchart. FIG. 4 is a flowchart that shows the processes of control executed by the vehicle failure analysis system 1 according to the first embodiment of the invention.

As shown in FIG. 4, when a failure occurs in any one of components in any one of the control systems in the vehicle in S1, the engine ECU 12 or brake ECU 13 of the vehicle shown in FIG. 2 detects occurrence of a failure in S2. As the engine ECU 12, brake ECU 13 or any one of the other ECUs transmits a code at the time of a failure, that is, a DTC, and FFD into the CAN in S3, the acquisition unit 2*c* of the car navigation ECU 2 receives and acquires the DTC and the FFD, that is, control information, and records the DTC and FFD in the EEPROM.

Subsequently, in S4, the faulty system identification unit 2*d* of the car navigation ECU 2 compares the instruction data X in the database 10 with the control information read from the EEPROM to carry out estimation, that is, mining. In S5, the faulty system identification unit 2*d* identifies a faulty control system from among the control systems.

In S6, the faulty system identification unit 2*d* of the car navigation ECU 2 outputs a command for carrying out fail-safe control to the identified control system, and then the identified control system carries out fail-safe control. In S7, the display unit 2*b* of the car navigation ECU 2 uses the display 11 to warn the driver by text or a warning mark indicator lamp to drive the vehicle to a dealer for check. In S8, the transmitting unit 2*e* of the car navigation ECU 2 transmits information about the identified control system and the FFD, that is, the control information, to the server 3 at the road-side center through the communication device 14, the base station 5 and the network.

In S9, the collecting unit 3*a* of the server 3 at the road-side center receives and collects the information about the identified control system and the corresponding control information, which are transmitted from the transmitting unit 2*e* of the car navigation ECU 2. In S10, the faulty component identification unit 3*b* of the server 3 reads only part of the instruction data Y in the storage device 73, corresponding to the identified control system, and carries out mining on the basis of a comparison of the collected control information with the read part of instruction data Y. In S11, the faulty component identification unit 3*b* identifies a faulty component.

In S12, the faulty component identification unit 3*b* of the server 3 at the road-side center transmits information about the identified component to the diagnostic tool 4 at the dealer through the network. In S13, the diagnostic tool 4 at the dealer receives the information about the identified component, and displays the received result on a display (not shown) to notify the driver who drove the vehicle to the dealer and a serviceman of the information about the identified component.

In accordance with this, the serviceman replaces or repairs the identified component. Then, in S14, the diagnostic tool 4 transmits information about the conducted replacement or repair of the component to the server 3 at the road-side center through the network.

In S15, the server 3 at the road-side center receives the information about the conducted replacement or repair of the component from the diagnostic tool 4 at the dealer, and associates the control information collected by the collecting unit 3*a* from the acquisition unit 2*c* of the car navigation ECU 2 at the vehicle side in S10 with the information about the conducted replacement or repair of the component to create newly added data that constitute the instruction data X and the instruction data Y. In S16, the server 3 at the road-side center updates both the pieces of instruction data X and Y in the storage device 73. In S17, the server 3 at the road-side center transmits the updated instruction data X to the receiving unit 2*f* of the car navigation ECU 2 at the vehicle side through the network and the base station 5.

In S18, the receiving unit 2*f* of the car navigation ECU 2 at the vehicle side receives the updated instruction data X from the server 3 at the road-side center. In S19, the faulty system identification unit 2*d* of the car navigation ECU 2 updates the instruction data X in the database 10 to the received instruction data X.

In the above described flowchart shown in FIG. 4, S1 to S3 may be regarded as an acquisition step of a vehicle failure analysis method according to the aspects of the invention, S4 and S5 may be regarded as a faulty system identifying step of the vehicle failure analysis method according to the aspects of the invention, S9 may be regarded as a collecting step of the vehicle failure analysis method according to the aspects of the invention, and S10 and S11 may be regarded as a faulty component identifying step of the vehicle failure analysis method according to the aspects of the invention.

According to the vehicle failure analysis system 1 of the first embodiment implemented by these processes of control and the vehicle failure analysis method executed by the vehicle failure analysis system 1, the following operations and advantages may be obtained. That is, in the vehicle equipped with the plurality of types of control systems, each of which is formed of one or more components, when a failure occurs in any one of the control systems, in the first step, the faulty system identification unit 2*d* of the car navigation ECU 2 is able to identify a faulty control system from among the control systems on the basis of a comparison of the pieces of control information, acquired by the acquisition unit 2*c*, with the instruction data X.

In accordance with the identification in the first step, the faulty component identification unit 3*b* of the server 3 at the road-side center reads only part of the instruction data Y partitioned in units of the control systems, corresponding to the identified control system, and is able to identify a faulty component from among the components of the identified faulty control system on the basis of a comparison of the part of the instruction data Y, corresponding to the identified control system, with the control information collected by the collecting unit 3*a* in the second step.

In the control systems in the vehicle formed of the engine ECU 12, the brake ECU 13 and the other ECUs, the instruction data X are used to just identify the control system. Thus, it is only necessary that the instruction data X include part of the entire control information, which is recognized as an item necessary for identifying the control system within the control information of the control system. Therefore, the data size of the instruction data X may be considerably smaller than that of the instruction data Y for identifying a faulty component. According to the first embodiment, using the above characteristic, it is possible to reduce the processing load of the faulty system identification unit 2*d* of the car navigation ECU 2, which identifies a faulty system on the basis of the instruction data X having a small data size.

In addition, the faulty system identification unit 3*b* of the server 3 at the road-side center also reads only part of the instruction data Y partitioned in units of the control systems, corresponding to the control system identified by the faulty system identification unit 2*d* in advance, and then compares the part of the instruction data Y, corresponding to the identified control system, with the control information collected by the collecting unit 3*a*. Thus, it is possible to reduce handling data size as much as possible to thereby reduce the processing load.

Furthermore, the faulty system identification unit 2*d* of the car navigation ECU 2 at the vehicle side is able to identify a faulty control system from among the plurality of types of control systems in the first step, which is the step before the faulty component identification unit 3*b* of the server 3 identifies a faulty component from among the components of the identified control system. Thus, in addition to the above described operations and advantages, the following operations and advantages may be obtained.

That is, when a failure occurs in any one of the components in the vehicle, it is necessary that the driver immediately drives the vehicle to a dealer, or the like, a serviceman at the dealer connects the diagnostic tool 4 to the CAN of the vehicle to identify a faulty component and then replacement or repair of the identified component is conducted. Before that step, the driver needs to safely move the vehicle from a failure site to the dealer, or the like.

In this way, when the vehicle is safely moved from the failure site to the dealer, or the like, it is necessary to carry out fail-safe control over the control system to which the faulty component belongs. Here, a faulty control system is immediately identified on the basis of the instruction data X and the control information to make it possible to promptly carry out the fail-safe control. That is, according to the first embodiment, information necessary for fail-safe control is immediately provided to a control system of the vehicle to make it possible to sufficiently provide useful information for control at the time of a failure.

In addition, the faulty system identification unit 2*d* is provided at the vehicle side, and the faulty component identification unit 3*b* is provided at the road side. Thus, the faulty system identification unit 2*d* at the vehicle side is able to identify a faulty control system from among the plurality of types of control systems in the step before the faulty component identification unit 3*b* at the road side identifies a faulty component from among the components of the identified control system. Therefore, it is only necessary that CAN transmission and reception is used to output a command for carrying out fail-safe control over the identified control system at the vehicle side. Hence, it is possible to further advantageously configure the vehicle failure analysis system 1.

Moreover, when the faulty component identification unit 3*b* at the road side identifies a faulty component from among the components of the identified faulty control system on the basis of a comparison of the instruction data Y with the collected control information, the faulty component identification unit 3*b* needs to have a large throughput because the data size of the instruction data Y is considerably larger than the data size of the instruction data X as described above. The server 3 at the road-side center may be configured to have a considerably larger throughput than the throughput of the car navigation ECU 2, so the vehicle failure analysis system 1 may be further advantageously configured by providing the faulty component identification unit 3*b* at the road side.

In addition, in the server 3 at the road-side center, data to be newly added to the instruction data Y that indicate the second correlation between the pieces of control information and the components may be acquired as needed from a plurality of different vehicles by the collecting unit 3*a*. Thus, it is possible to further easily optimize the instruction data Y by updating the instruction data Y one after another.

Furthermore, when a failure occurs at a vehicle side, in consideration of that it is only necessary to identify a control system to which a faulty component belongs in order to safely move the vehicle from a failure site to a dealer, or the like, and it is not necessary to identify a faulty component because it is impractical that the vehicle is always loaded with components for replacement, only the faulty system identification unit 2*d* is provided at the vehicle side. This makes it possible to appropriately share the functions between the vehicle side and the road side.

Note that in the vehicle failure analysis system 1 according to the above described first embodiment, the communication device 14 is connected to the car navigation ECU 2, and data transmission and reception is carried out between the car navigation ECU 2 and the server 3 at the road-side center where necessary. Instead, when no communication device 14 is provided as well, the aspects of the invention may be applied. Hereinafter, a vehicle failure analysis system according to a second embodiment with no communication device 14 wilt be described.

Figure 5:
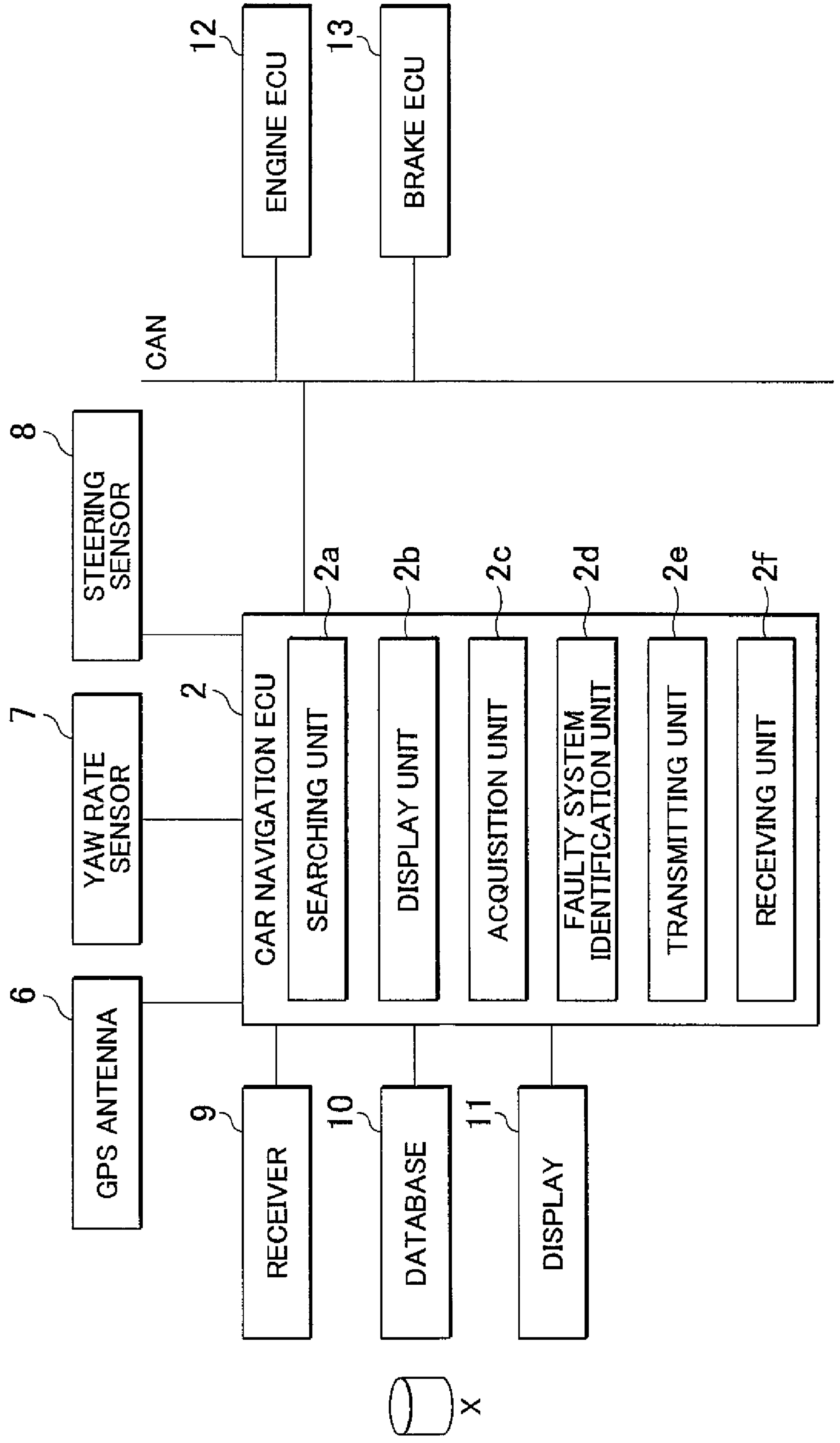
FIG. 5 is a block diagram that shows part of the vehicle failure analysis system according to a second embodiment of the invention.
Figure 6A:
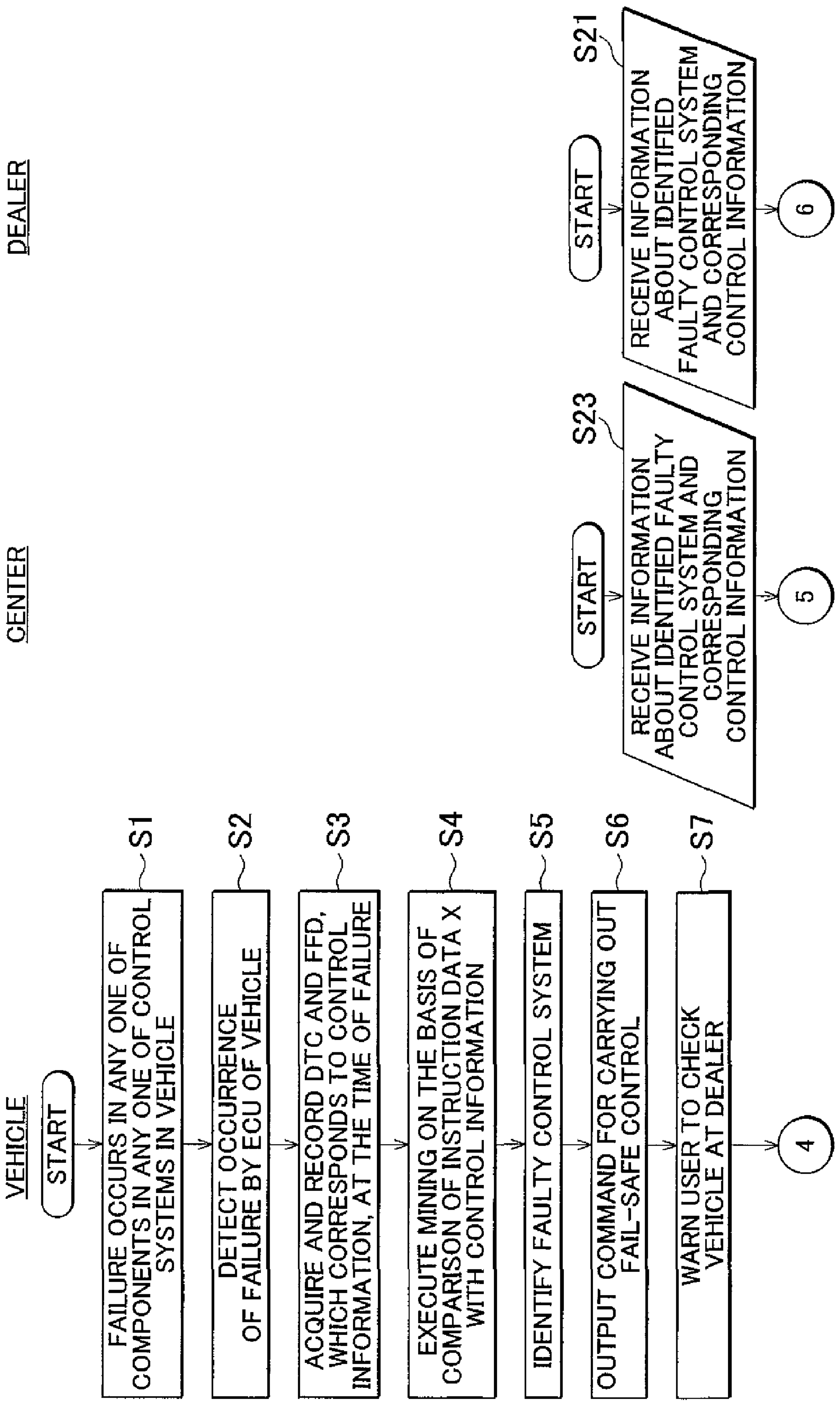
FIGS. 6A and 6B are flowcharts that show the processes of control executed by the vehicle failure analysis system according to the second embodiment of the invention.
Figure 6B:
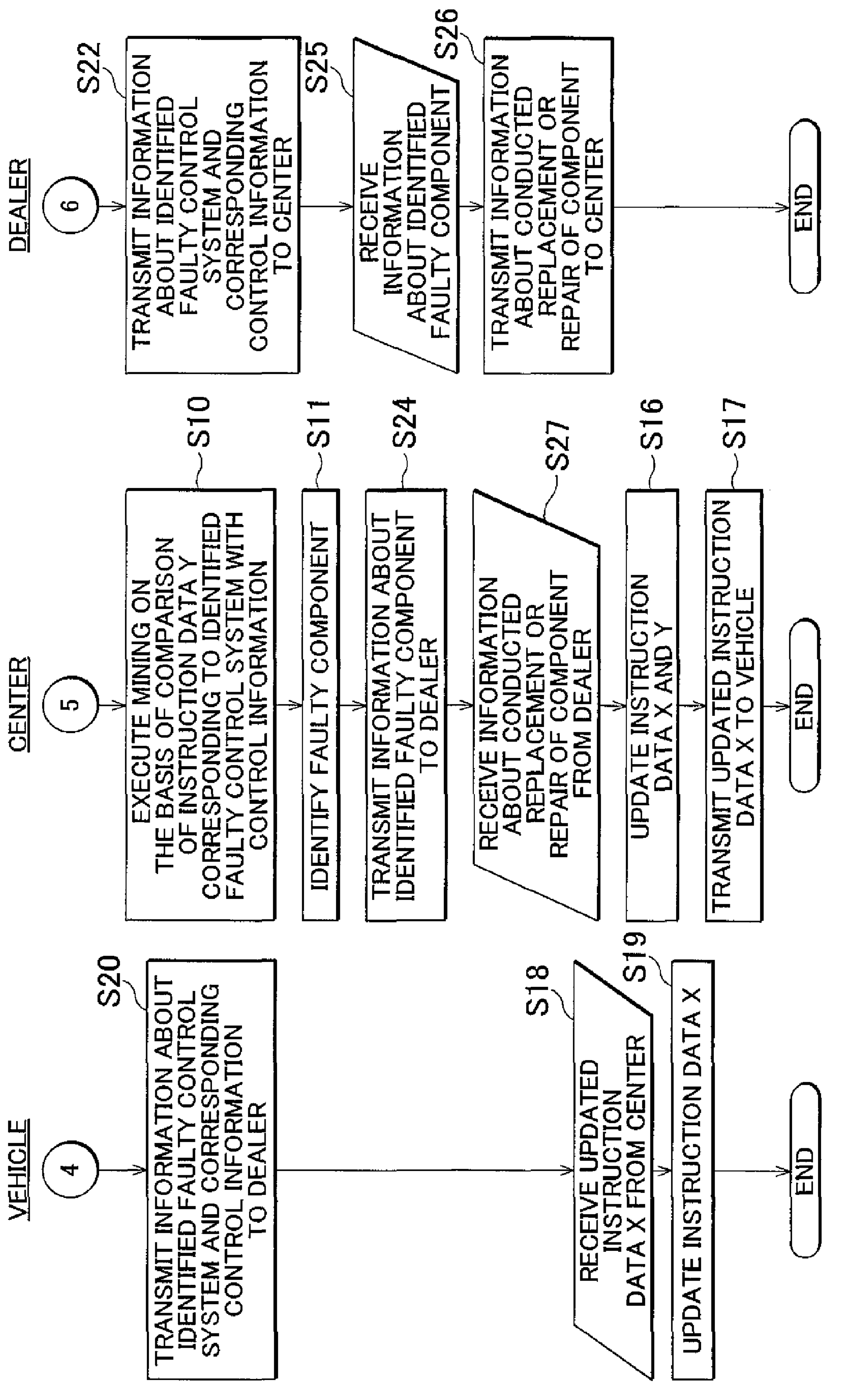

FIG. 5 is a block diagram that shows part of the vehicle failure analysis system according to the second embodiment of the invention. FIG. 6 is a flowchart that shows the processes of control executed by the vehicle failure analysis system according to the second embodiment of the invention. Note that components that constitute the vehicle failure analysis system according to the second embodiment is similar to those of the first embodiment except that the communication device 14 is excluded, so like reference numerals denote similar components and the overlap description is omitted.

Hereinafter, the processes of control executed by the vehicle failure analysis system 1 according to the second embodiment will be described with reference to the flowchart shown in FIG. 6. In addition, in the flowchart as well, like reference numerals denote similar processes to those of the first embodiment, that is, to those shown in FIG. 4, and the overlap description is omitted.

After the process of S7 is executed, in S20, the diagnostic tool 4 is connected to the CAN of the vehicle at a dealer at the road side, and, at the time when the transmitting unit 2*e* of the car navigation ECU 2 receives a request signal of the diagnostic tool 4, the transmitting unit 2*e* transmits information about the control system identified in S5 and the corresponding control information to the diagnostic tool 4.

In S21, the diagnostic tool 4 receives the information about the identified control system and the corresponding control information, and transmits these information about the identified control system and corresponding control information to the server at the road-side center through the network. In S23, the collecting unit 3*a* of the server 3 at the road-side center receives and collects these information about the identified control system and corresponding control information, and executes the already described processes of S10 and S11. In S24, the collecting unit 3*a* transmits the information about the identified component to the diagnostic tool 4 at the dealer. In S25, the diagnostic tool 4 receives the information about the identified component, displays the received result on a display (not shown), and notifies the driver who drove the vehicle to the dealer and a serviceman of the information about the identified component.

In accordance with this, the serviceman replaces or repairs the identified component. Then, in S16, the diagnostic tool 4 transmits information about the conducted replacement or repair of the component to the server 3 at the road-side center through the network.

In S17, the server 3 at the road-side center receives the information about the conducted replacement or repair of the component from the diagnostic tool 4 at the dealer, and associates the control information collected by the collecting unit 3*a* from the acquisition unit 2*c* of the car navigation ECU 2 at the vehicle side in S10 with the information about the conducted replacement or repair of the component to create newly added data that constitute the instruction data X and the instruction data Y. Then, the already described processes of S16 to S19 are executed.

According to the vehicle failure analysis system 1 of the second embodiment implemented by these processes of control, even when no communication device 14 is provided, similar operations and advantages to those of the first embodiment may be obtained.

Figure 7:
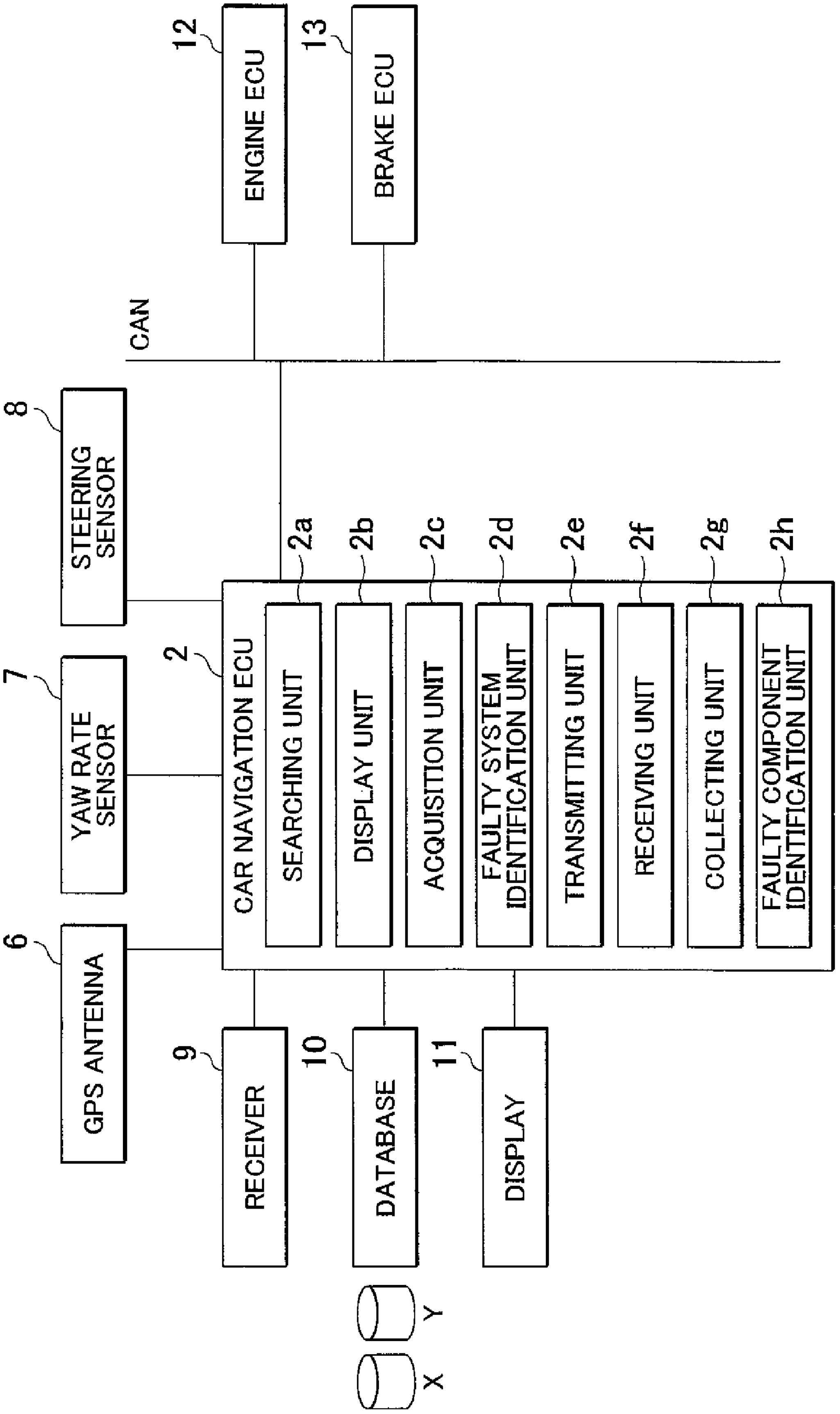
FIG. 7 is a block diagram that shows a vehicle failure analysis system according to a third embodiment of the invention.

Note that in the above described first and second embodiments, both the collecting unit 3*a* and the faulty component identification unit 3*b* are provided in the server 3 at the road-side center; instead, as long as sufficient performance of the car navigation ECU 2 at the vehicle side may be sufficiently ensured, the car navigation ECU 2 may include a collecting unit 2*g* and a faulty component identification unit 2*h* as shown in FIG. 7. Hereinafter, a vehicle failure analysis system according to a third embodiment with both the collecting unit 2*g* and the faulty component identification unit 2*h* provided for the car navigation ECU 2 will be described.

Figure 8A:
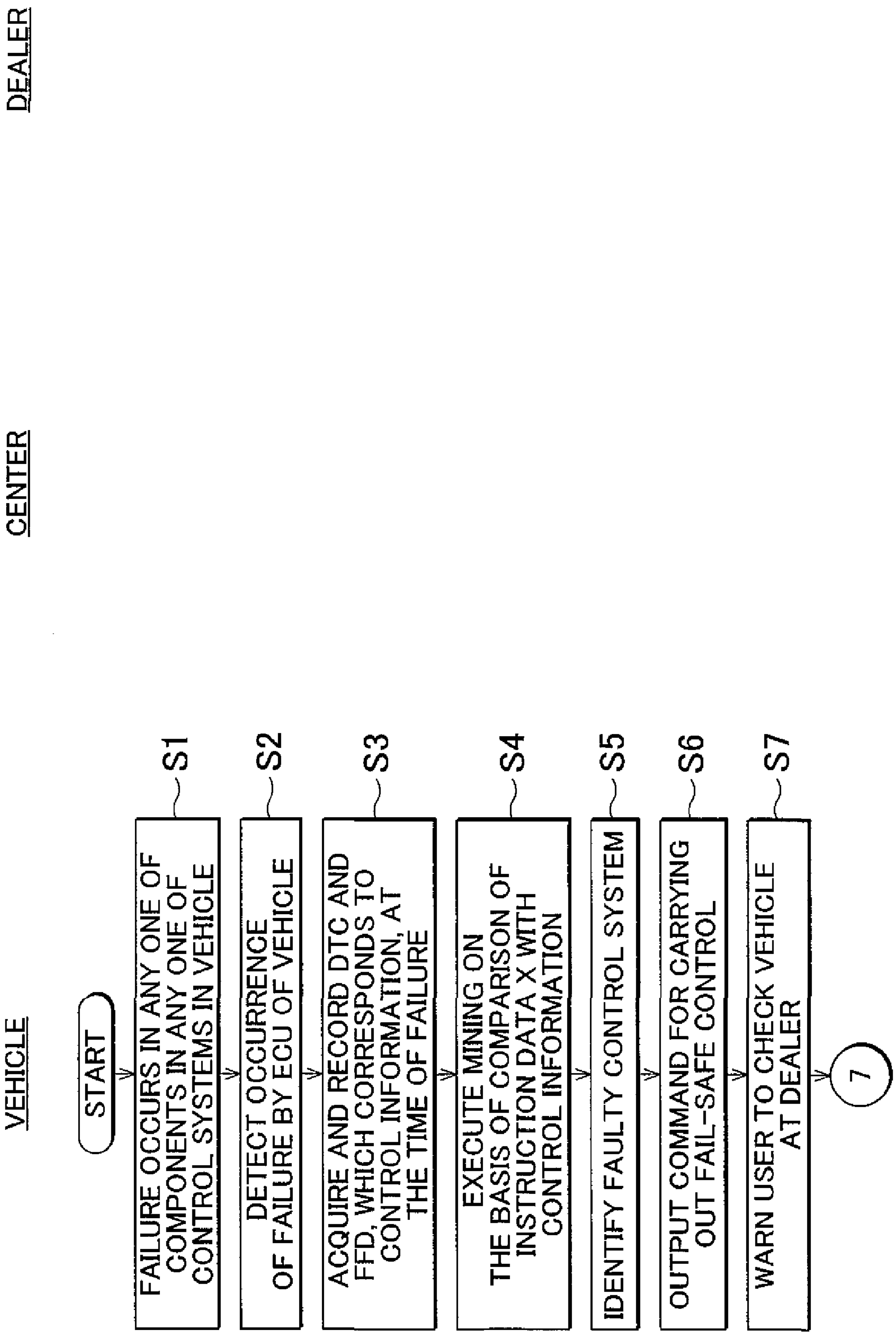
FIGS. 8A and 8B are block diagrams that show part of the vehicle failure analysis system according to the third embodiment of the invention.
Figure 8B:
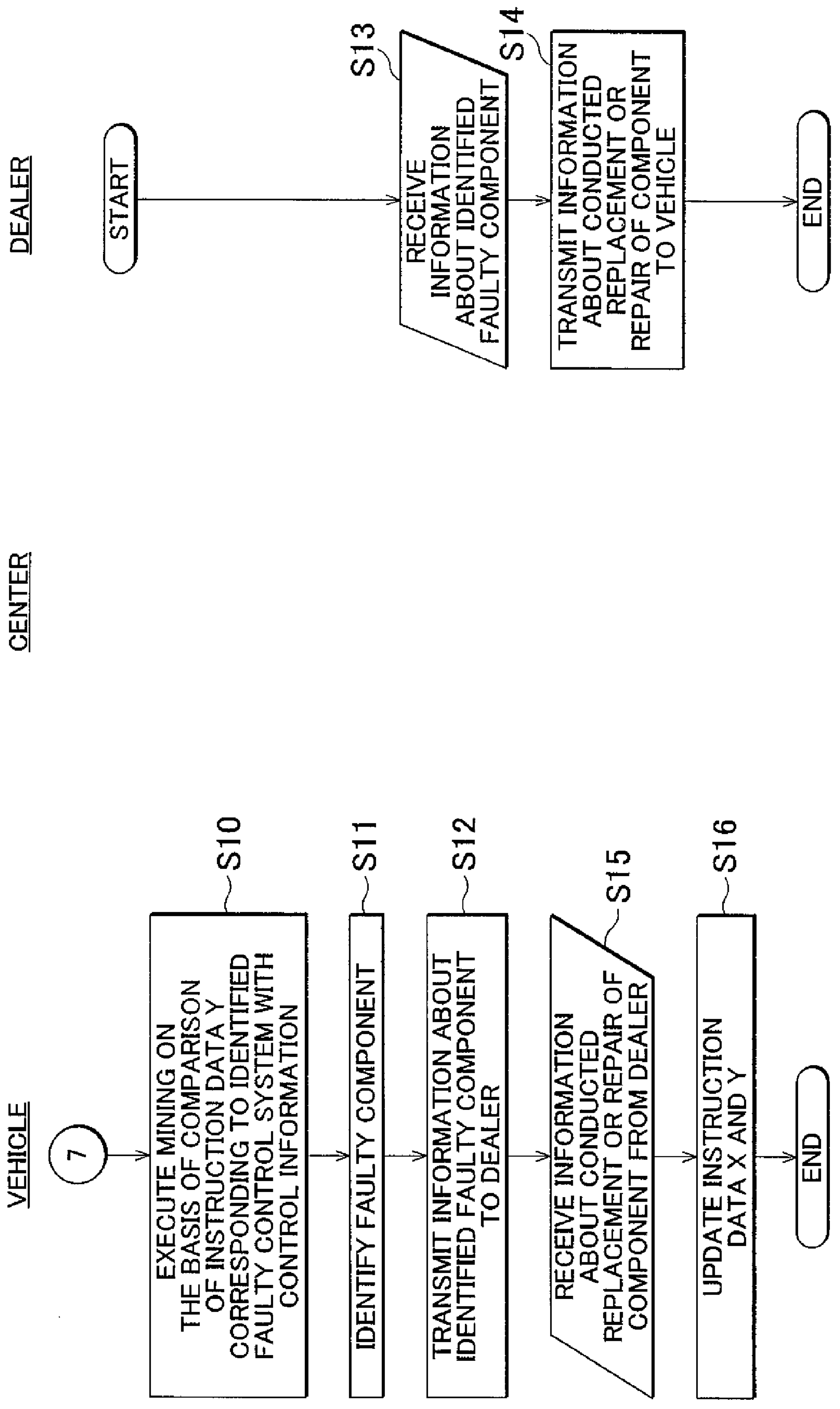

Here, the vehicle failure analysis system 1 is synonymous with a vehicle failure analysis apparatus, and the overall configuration is such that the road-side center is excluded from the configuration shown in FIG. 1. As shown in FIG. 7, the car navigation ECU 2 includes the collecting unit 2*g* and the faulty component identification unit 2*h*. In this case, both the instruction data X and the instruction data Y are contained in the database 10, and the processes of control are configured as the flowchart shown in FIG. 8. Here, the processes are similar to those shown in FIG. 4, and only the devices that execute the processes are different, so the individual description is omitted.

With the above configuration, it is possible to identify a faulty component from among the components of the control system identified in the first step at the vehicle side. Therefore, it is possible to carry out fail-safe control only over part of the identified control system, related to the component identified in the second step. Thus, the flexibility of fail-safe control at the time of a failure is improved to make it possible to make a detailed response to a driver's need.

The components according to the embodiments of the invention may be one or more components that are in-vehicle devices or that constitute in-vehicle devices, components, such as sensors that detect various types of control information related to these components, and components, such as ECUs that control these components using these various types of control information. The control systems each are formed of a group of these components that are connected to one another directly, through the CAN, or the like, in order to implement various controls in the vehicle. The control systems may be, for example, a plurality of types of control systems that are typically an intake system, exhaust system and ignition system of an engine, a brake system, a car navigation system and an air conditioning system.

The first correlation may be a database that contains a correlation derived using a method, such as statistics and pattern recognition, on the basis of large amounts of data that associate the pieces of control information acquired by the acquisition unit in a past travel history of the vehicle with actual failures, and may be instruction data necessary for the faulty system identification unit to identify a faulty control system from among the control systems.

The second correlation may be a database that contains a correlation derived using a method, such as statistics and pattern recognition, on the basis of large amounts of data that associate the pieces of control information collected by the collecting unit from the acquisition unit in a past travel history of the vehicle with actual failures, and may be instruction data necessary for the faulty component identification unit to identify a faulty component from among the components of each control system.

Generally, the first correlation is the instruction data for just identifying the faulty control system, so it is only necessary to include part of the control information of the control systems, corresponding to minimum items that may be necessary for identifying a faulty control system. Thus, the first correlation has a data size that is considerably smaller than that of the second correlation, which is the instruction data for identifying a faulty component. By so doing, it is possible to reduce a processing load on the faulty system identification unit.

In the embodiments of the invention, when a failure occurs in any one of the components in the vehicle, it is necessary that the driver drives the vehicle to a dealer, or the like, a faulty component is identified from among the components, and then replacement or repair of the identified component is conducted. Before that step, the driver needs to safely move the vehicle from a failure site to the dealer, or the like.

When the driver safely moves the vehicle from a failure site to the dealer, or the like, it is necessary to carry out fail safe control over the control system to which the faulty component belongs. By immediately identifying the faulty control system, it is possible to promptly carry out the fail-safe control. That is, information necessary for fail-safe control is immediately provided to make it possible to sufficiently provide useful information for control at the time of a failure.

In order to safely move the vehicle from a failure site to the dealer, or the like, at the time of the failure, it is only necessary to just identify a control system, to which a faulty component belongs, at the vehicle side. It is not necessary to identify a faulty component because it is impractical to always load the vehicle with components for replacement. In terms of the above, it is enough to provide only the faulty system identification unit at the vehicle side.

Note that when both the faulty system identification unit and the faulty component identification unit are provided at the vehicle side, the vehicle failure analysis system may be regarded as a vehicle failure analysis apparatus mounted at the vehicle side.

Here, the first correlation is the instruction data for just identifying the faulty control system, the first correlation has a data size that is considerably smaller than that of the second correlation, which is the instruction data for identifying a faulty component. Thus, it is possible to reduce the processing load in the faulty system identifying step.

The vehicle failure analysis system, vehicle failure analysis apparatus and vehicle failure analysis method according to the embodiments of the invention are able to sufficiently provide useful information for control at the time of a failure without increasing a processing load, so the vehicle failure analysis system, vehicle failure analysis apparatus and vehicle failure analysis method are advantageously applied to various vehicles, such as passenger cars, trucks and buses.

While the invention has been described with reference to example embodiments thereof it is to be understood that the invention is not limited to the described embodiments or constructions. On the other hand, the invention is intended to cover various modifications and equivalent arrangements. In addition, while the various elements of the disclosed invention are shown in various example combinations and configurations, other combinations and configurations, including more, less or only a single element, are also within the scope of the appended claims.

What is claimed is:

1. A vehicle failure analysis system for a vehicle equipped with a plurality of control systems, each of which includes one or more components, the vehicle failure analysis system comprising:

a faulty system identification unit that identifies a faulty control system from among the plurality of control systems; and a faulty component identification unit that identifies a faulty component from among the one or more components which are constituents of the identified control system.

2. The vehicle failure analysis system according to claim 1, further comprising:

an acquisition unit that acquires pieces of control information from the plurality of control systems, wherein the faulty system identification unit identifies the faulty control system from among the plurality of control systems by comparing a first correlation between the pieces of control information and the control systems with the pieces of control information acquired by the acquisition unit.

3. The vehicle failure analysis system according to claim 2, wherein the faulty system identification unit determines the first correlation on the basis of a relationship between the control information acquired by the acquisition unit and an actual failure.

4. The vehicle failure analysis system according to claim 2, further comprising:

a collecting unit that collects the control information from the acquisition unit, wherein the faulty component identification unit identifies the faulty component from among the one or more components by comparing a second correlation between the one or more components and the pieces of control information partitioned in units of the control systems with the control information collected by the collecting unit.

5. The vehicle failure analysis system according to claim 4, wherein the faulty component identification unit determines the second correlation on the basis of a relationship between the control information collected by the collecting unit and an actual failure.

6. The vehicle failure analysis system according to claim 4, wherein the faulty system identification unit is provided for the vehicle, and the faulty component identification unit is provided at a location other than the vehicle.

7. The vehicle failure analysis system according to claim 4, wherein the faulty system identification unit and the faulty component identification unit are provided for the vehicle.

8. A vehicle failure analysis apparatus for a vehicle equipped with a plurality of control systems, each of which includes one or more components, the vehicle failure analysis apparatus comprising:

a faulty system identification unit that identifies a faulty control system from among the plurality of control systems; and a faulty component identification unit that identifies a faulty component from among the one or more components which are constituents of the identified control system.

9. The vehicle failure analysis apparatus according to claim 8, further comprising:

an acquisition unit that acquires pieces of control information from the plurality of control systems, wherein the faulty system identification unit identifies the faulty control system from among the plurality of control systems by comparing a first correlation between the pieces of control information and the control systems with the pieces of control information acquired by the acquisition unit.

10. The vehicle failure analysis apparatus according to claim 9, further comprising:

a collecting unit that collects the control information from the acquisition unit, wherein the faulty component identification unit identifies a faulty component from among the one or more components by comparing a second correlation between the one or more components and the pieces of control information partitioned in units of the control systems with the control information collected by the collecting unit.

11. A vehicle failure analysis method for a vehicle equipped with a plurality of control systems, each of which includes one or more components, the vehicle failure analysis method comprising:

identifying a faulty control system from among the plurality of control systems; and identifying a faulty component from among the one or more components which are constituents of the identified control system.

12. The vehicle failure analysis method according to claim 11, further comprising:

acquiring pieces of control information from the plurality of control systems, wherein the faulty control system is identified from among the plurality of control systems by comparing a first correlation between the pieces of control information and the control systems with the acquired pieces of control information.

13. The vehicle failure analysis method according to claim 12, further comprising:

collecting the control information acquired from the plurality of control systems, wherein the faulty component is identified from among the one or more components by comparing a second correlation between the one or more components and the pieces of control information partitioned in units of the control systems with the collected control information.

14. The vehicle failure analysis system according to claim 1, wherein the plurality of control systems are control units that respectively control different vehicle devices.

15. The vehicle failure analysis system according to claim 14, wherein the plurality of control systems comprise a engine control unit and a brake control unit.

16. The vehicle failure analysis apparatus according to claim 8, wherein the plurality of control systems are control units that respectively control different vehicle devices.

17. The vehicle failure analysis system according to claim 16, wherein the plurality of control systems comprise a engine control unit and a brake control unit.

18. The vehicle failure analysis method according to claim 11, wherein the plurality of control systems are control units that respectively control different vehicle devices.

19. The vehicle failure analysis method according to claim 18, wherein the plurality of control systems comprise a engine control unit and a brake control unit.

* * * * *